UNITED STATES PATENT OFFICE.

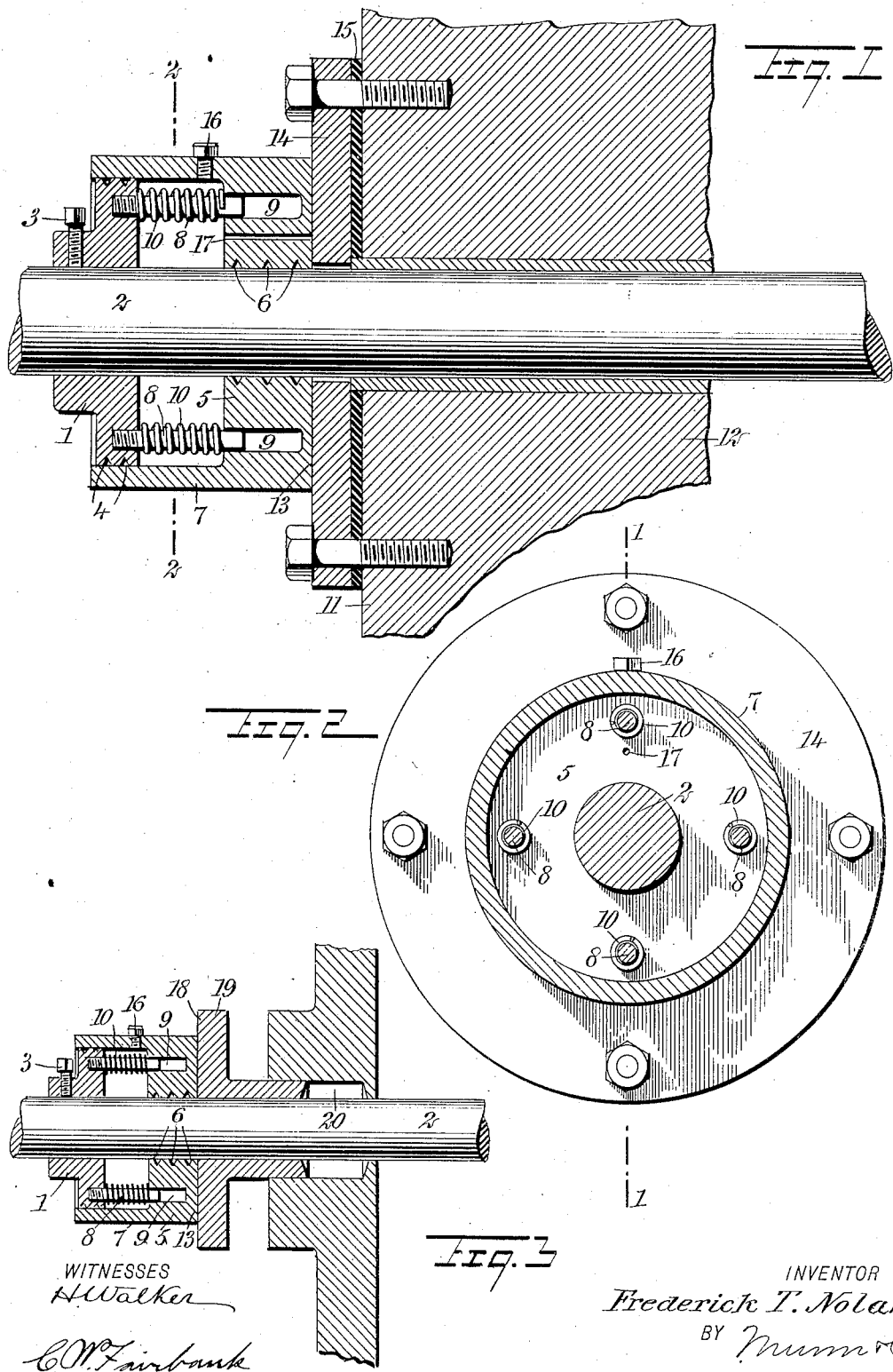

FREDERICK THOMAS NOLAN, OF CRYSTAL RIVER, FLORIDA.

SHAFT-PACKING.

No. 846,237.     Specification of Letters Patent.     Patented March 5, 1907.

Application filed November 9, 1906. Serial No. 342,657.

*To all whom it may concern:*

Be it known that I, FREDERICK THOMAS NOLAN, a citizen of the United States, and a resident of Crystal River, in the county of Citrus and State of Florida, have invented a new and Improved Shaft-Packing, of which the following is a full, clear, and exact description.

This invention relates to certain improvements in shaft-packings; and the object of the invention is to provide a packing for rotatable shafts which is air and water tight and in which there is the minimum amount of friction.

Reference is to be had to the accompanying drawings, forming a part of this specification, in which similar characters of reference indicate corresponding parts in all the figures, in which—

Figure 1 is a longitudinal section through one form of my improved packing, said section being taken on the line 1 1 of Fig. 2. Fig. 2 is a transverse section on the line 2 2 of Fig. 1, and Fig. 3 is a longitudinal section showing my improved packing used in connection with the ordinary gland.

In the specific embodiment of my invention, which I have illustrated in the drawings, I provide a collar 1, tightly fitting the rotatable shaft 2 and being rigidly secured thereto in any suitable manner—as, for instance, by means of a set-screw 3. The outer surface of this collar is ground to a perfectly cylindrical surface and may, if desired, be provided with a plurality of annular grooves 4 for oil or may be provided with packing-rings. A second collar 5 is provided upon the shaft 2, and this collar also tightly fits the shaft, but is not rigidly secured thereto. The inner surface of this collar is provided with grooves 6, similar to the outer surface of the collar 1. The collar 5 carries an annular flange 7, the inner surface of which closely fits the outer surface of the collar 1, and means are provided whereby the rotation of the shaft and the collar 1 causes the rotation of the collar 5, but permits the longitudinal movement of the latter in respect to the shaft. This means preferably comprises pins or projections 8, carried by one of the collars—as for instance, the collar 1, and fitting into oppositely-disposed recesses or pockets 9 in the other collar. Coil-springs 10 surround each of the pins or projections 8 and serve to normally force the collars away from each other.

In applying my improved packing to a shaft in connection with which no gland is employed I may either grind the outer surface 11 of the journal-box 12 to form a perfectly smooth surface for engagement with the smooth polished surface 13 of the collar 5, or to avoid this I may provide a plate 14, having a smooth outer surface and rigidly secured to the outer surface of the journal-box. To prevent leakage between this plate and the journal-box, I preferably insert a layer of soft rubber 15 or other suitable material between said plate and the journal-box. This plate is held stationary with the journal-box, and its polished outer surface is in engagement with the polished surface 13 of the collar 5. The collar is caused to rotate with the shaft, but is at all times forced tightly into engagement with the plate through the action of the coil-springs 10. The annular flange of the collar 5 is preferably provided with an oil-hole, whereby oil may be inserted between the two collars, and this hole may be closed in any suitable manner—as, for instance, by a screw-bolt 16. The oil in the space between the two collars may work into the same between the flange 7 and the collar 1 and also between the collar 5 and the shaft. The oil serves to form a perfectly tight joint at these places and prevents the escape or entrance of air or water into the journal-box. The collar 5 is also preferably provided with an oil-hole 17, extending through the collar, whereby the oil in the space between the two collars may pass into engagement with the oppositely-disposed bearing-surfaces of the collar 5 and the plate 14. The surfaces contacting at this point are both ground as true as possible, and as the collar is resiliently forced into engagement with the plate and as the two surfaces are kept oiled no air or water can enter the journal-box between the two.

My improved packing above described may be used in connection with rotatable shafts which are already provided with packing-glands. In this case the surface 13 of the collar 5 is brought into engagement with the outer surface 18 of the packing-gland 19, which latter serves to hold in place any suitable packing material within the space 20.

In order to apply my improved packing to shafts without removing the latter from the machine, I may form each of the two collars of two sections adapted to be bolted together. In this case all that is necessary to apply the device is to separate the two sections of each collar and bolt them together again with the shaft inclosed.

It is evident that the surface 13 need not necessarily be perfectly flat, but may be either convex, concave, or provided with flanges or corrugations. All that is necessary is that the surface against which said collar contacts shall be formed similar to the surface of said collar, whereby a tight fit may be effected.

Having thus described my invention, I claim as new and desire to secure by Letters Patent—

1. The combination with a rotatable shaft, of a collar rigidly secured thereto, a second collar spaced from the first-mentioned collar upon said shaft and having an annular flange in engagement with the circumferential surface of the first-mentioned collar, and projections carried by one of said collars adapted to engage with the other collar, whereby the two are caused to rotate simultaneously and with the shaft.

2. The combination with a rotatable shaft, of a collar rigidly secured thereto, a second collar mounted upon said shaft and having an annular flange in engagement with the outer surface of the first-mentioned collar, projections carried by one of said collars and in engagement with recesses of the other collar, and means intermediate said collars and normally tending to force them apart.

3. The combination with a rotatable shaft, of a collar rigidly secured thereto, a second collar carried by said shaft and having an annular flange in engagement with a surface of the first-mentioned collar, projections carried by one of said collars and adapted to engage in recesses of the other collar for causing their simultaneous rotation, and spiral springs intermediate said collars and normally tending to move the second-mentioned collar in respect to the first-mentioned one.

4. The combination with a rotatable shaft, of a journal-box within which said shaft rotates, a collar secured to said shaft and having a cylindrical outer surface, a second collar intermediate said first-mentioned collar and the journal-box and in engagement with the outer surface of the latter, an annular flange carried by said last-mentioned collar and in engagement with the cylindrical surface of the first-mentioned collar, and means intermediate said collars for forcing the second-mentioned collar into engagement with the journal-box and causing the simultaneous rotation of the two collars with the shaft.

5. The combination with a rotatable shaft, of a journal-box within which said shaft rotates and provided with a smooth outer surface, a collar mounted upon the shaft and having one side thereof in engagement with said surface, and means carried by said shaft for causing the rotation of the collar with the shaft, and resiliently forcing said collar into engagement with said surface.

6. The combination with a rotatable shaft, of a journal-box within which said shaft rotates and presenting a smooth outer surface, a collar rigidly secured to said shaft and having a cylindrical outer surface, a second collar intermediate said journal box and said first-mentioned collar and having an annular flange in engagement with the outer surface of the first-mentioned collar, means intermediate the collars for causing their simultaneous rotation, means intermediate said collars for forcing the second-mentioned collar into engagement with the journal-box, and means for admitting oil to the space between the collars and to the bearing-surface of the journal-box and the second-mentioned collar.

7. The combination with a rotatable shaft, of a collar rigidly secured thereto, said collar having an outer cylindrical surface, a second collar mounted upon said shaft but spaced from the first-mentioned collar, a cylindrical flange carried by the second collar and in engagement with the cylindrical surface of the first-mentioned collar, said collars and flange forming an annular inclosure, a plurality of pins carried by the first-mentioned collar and extending into engagement with the second-mentioned collar within the annular flange, resilient means for forcing said collars apart, and means for admitting oil to the annular chamber between said collars.

In testimony whereof I have signed my name to this specification in the presence of two subscribing witnesses.

FREDERICK THOMAS NOLAN

Witnesses:
O. N. BIE,
N. BARCO.